(12) United States Patent
Yen

(10) Patent No.: US 7,548,504 B2
(45) Date of Patent: Jun. 16, 2009

(54) INPUT SAMPLING CIRCUIT AND METHOD FOR PROCESSING DISC READ BACK SIGNAL

(75) Inventor: Kuang-Yu Yen, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 973 days.

(21) Appl. No.: 10/908,072

(22) Filed: Apr. 27, 2005

(65) Prior Publication Data

US 2005/0243681 A1 Nov. 3, 2005

(30) Foreign Application Priority Data

Apr. 29, 2004 (TW) .............................. 93112068 A

(51) Int. Cl.
*G11B 20/10* (2006.01)

(52) U.S. Cl. .................................. 369/59.21; 369/47.35

(58) Field of Classification Search ....................... None
See application file for complete search history.

(56) References Cited

U.S. PATENT DOCUMENTS

2002/0005795 A1 1/2002 Asano

*Primary Examiner*—Paul Huber
(74) *Attorney, Agent, or Firm*—Winston Hsu

(57) ABSTRACT

An input sampling circuit for processing a disc read back signal to generate a digital signal includes an auto gain control (AGC) unit for adjusting a gain value of the disc read back signal, a low-pass filter/equalizer (LPF/EQ) coupled to the AGC unit for low-pass filtering/equalizing the disc read back signal to generate an output signal, and an analog-to-digital converter (ADC) coupled to the LPF/EQ for performing analog-to-digital conversion on the output signal across a conversion range that is narrower than a dynamic range of the output signal to convert the output signal into the digital signal.

18 Claims, 8 Drawing Sheets of the input signal LRADC_in is utilized for illustrating a dynamic range DR and a conversion range CR of the LRADC 116 according to this embodiment.

INPUT SAMPLING CIRCUIT AND METHOD FOR PROCESSING DISC READ BACK SIGNAL

BACKGROUND OF INVENTION

1. Field of the Invention

The present invention relates to optical storage systems, and more particularly, to an input sampling circuit and a method for processing a disc read back signal.

2. Description of the Prior Art

Recently, optical storage technologies, such as CD and DVD, have become the main stream for storage media applications due to their portable characteristic and high storage volume. Usually, when processing a disc read back signal read from a pickup, an optical disc drive system utilizes an analog-to-digital converter (ADC) to sample the disc read back signal, and generate corresponding digital data for subsequent digital signal processing operations.

However, as the rotational speed of the optical disc drive system increases along with the progress of technology, thereby causing high speed applications to be introduced, the sampling rate of the ADC also increases accordingly and can even reach up to the degree of several hundred MHz. In addition, in order to maintain the sampling resolution of the ADC above certain level when the ADC performs analog-to-digital conversion on the disc read back signal, the number of bits of the digital data generated by the ADC may not be decreased. Usually, the number of bits is designated six bits or more. As a result, the optical disc drive system suffers larger die size and higher power consumption of the ADC within.

SUMMARY OF INVENTION

It is therefore an objective of the present invention to provide an input sampling circuit and a method for processing a disc read back signal, which is capable of utilizing an analog-to-digital converter (ADC) of fewer bits.

According to an embodiment of the present invention, an input sampling circuit for processing a disc read back signal to generate a digital signal is disclosed. The input sampling circuit includes: an auto gain control (AGC) unit for adjusting a gain value of the disc read back signal; a low-pass filter/equalizer (LPF/EQ) coupled to the AGC unit for low-pass filtering/equalizing the disc read back signal to generate an output signal; and an ADC coupled to the LPF/EQ for performing analog-to-digital conversion on the output signal across a conversion range that is narrower than a dynamic range of the output signal to convert the output signal into the digital signal.

According to an embodiment of the present invention, an input sampling method for processing a disc read back signal to generate a digital signal is further disclosed. The input sampling method includes: adjusting a gain value of the disc read back signal; low-pass filtering/equalizing the disc read back signal to generate an output signal; and performing analog-to-digital conversion on the output signal across a conversion range that is narrower than a dynamic range of the output signal to convert the output signal into the digital signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
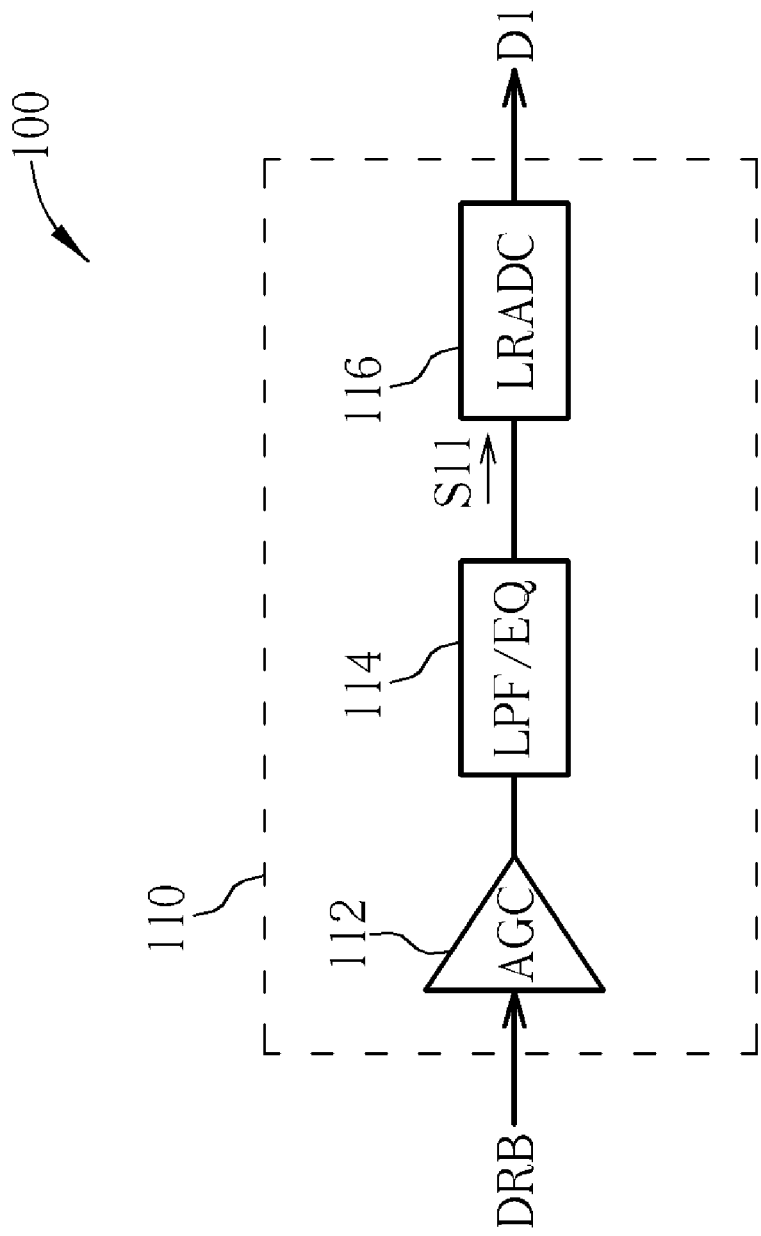
FIG. 1 is a diagram of an input sampling circuit according to a first embodiment of the present invention.

Please refer to FIG. 1. FIG. 1 illustrates a diagram of an input sampling circuit 100 according to a first embodiment of the present invention. The input sampling circuit 100 shown in FIG. 1 is utilized for processing a disc read back signal DRB read from a pickup in an optical disc drive system to generate a digital signal D1. The input sampling circuit 100 includes an auto gain control (AGC) unit 112, a low-pass filter/equalizer (LPF/EQ) 114, and a low-resolution analog-to-digital converter (ADC) 116. For simplicity, the low resolution ADC 116 is hereafter referred to as the LRADC 116. The implementation of the AGC unit 112, the LPF/EQ 114, and the LRADC 116 in this embodiment are well known to those skilled in the art of optical disc drive systems and therefore have no need to be detailed herein.

Figure 2:
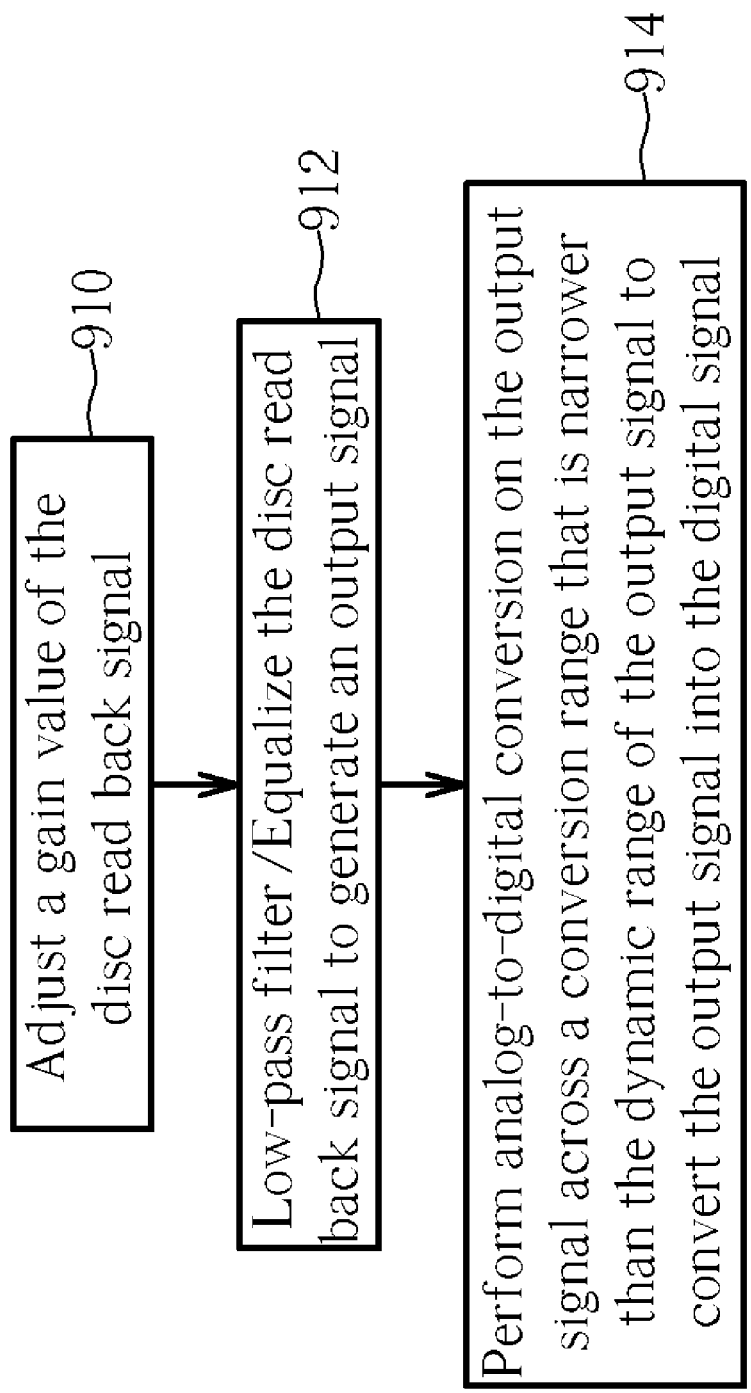
FIG. 2 is a flowchart of an input sampling method according to an embodiment of the present invention.

Please refer to FIG. 2 illustrating a flowchart of an input sampling method according to an embodiment of the present invention. Please note that in the following, the input sampling circuit 100 shown in FIG. 1 is taken as an example for describing the input sampling method shown in FIG. 2. In addition and as would be appreciated by those of ordinary skill in the art, the order of the following steps does not serve as limiting to the present invention.

Step 910: Adjust a gain value of the disc read back signal DRB with the AGC unit 112.

Step 912: Low-pass filter/Equalize the disc read back signal DRB with the LPF/EQ 114 to generate an output signal S11.

Step 914: Perform analog-to-digital conversion on the output signal S11 with the LRADC 116 across a conversion range CR that is narrower than a dynamic range DR of the output signal S11 to convert the output signal S11 into the digital signal D1.

Figure 3:
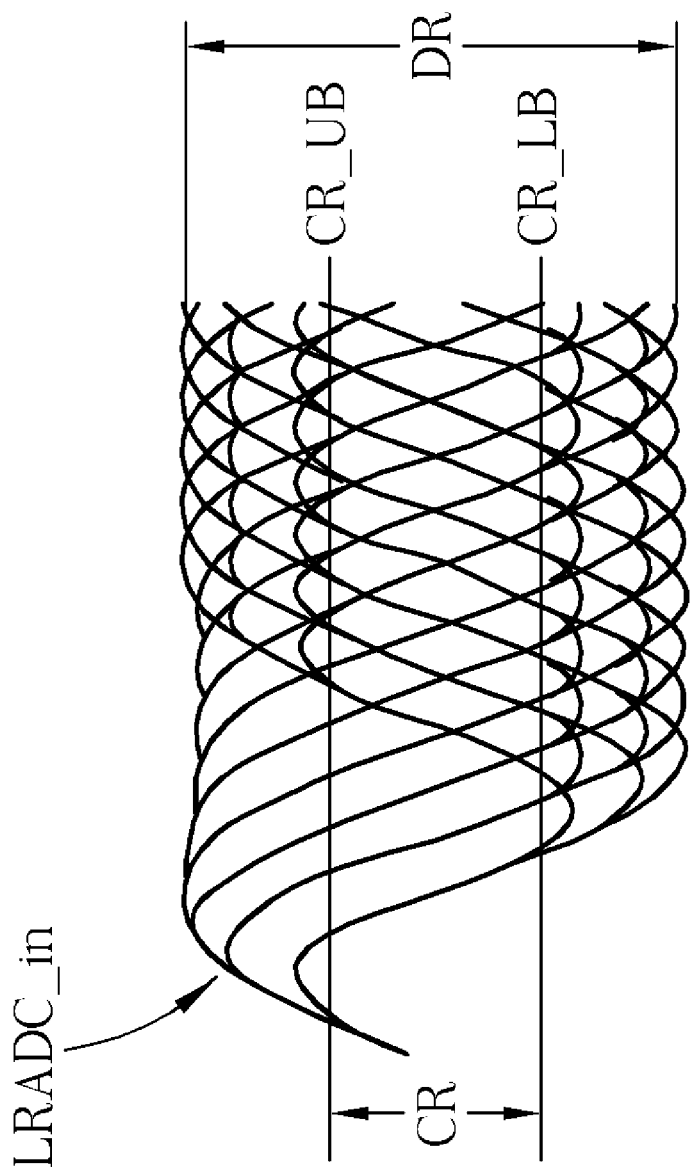
FIG. 3 is a diagram of a conversion range of the low-resolution analog-to-digital converter (ADC) shown in FIG. 1.

Please refer to FIG. 3 for the analog-to-digital conversion operation performed by the LRADC 116 in Step 914. FIG. 3 illustrates an eye diagram of an input signal LRADC_in of the LRADC 116 shown in FIG. 1, wherein the input signal LRADC_in is the output signal S11 generated by the LPF/EQ 114 shown in FIG. 1 according to this embodiment. The use and significance of an eye diagram are well known in the art and therefore are not described herein. In addition, those skilled in the art should understand that the eye diagram shown in FIG. 3 is derived in a situation where the disc read back signal DRB does not demonstrate a non-linear characteristic. According to this embodiment, in Step 914, the LRADC 116 performs the analog-to-digital conversion on the output signal S11 (i.e. the input signal LRADC_in) across a conversion range CR that is narrower than the dynamic range DR of the output signal S11 in order to convert the output signal S11 into the digital signal D1. The LRADC 116 sets the digital signal D1 to be a digital value representative of an upper bond CR_UB of the conversion range CR when a level of the output signal S11 is greater than the upper bond CR_UB, and the LRADC 116 sets the digital signal D1 to be a digital value representative of a lower bond CR_LB of the conversion range CR when a level of the output signal S11 is less than the lower bond CR_LB. In other words, when a level of the output signal S11 falls outside of the conversion range CR, the LRADC 116 performs a saturating operation on the output signal S11 to generate the digital signal D1. In this embodiment and as shown in FIG. 3, the conversion range CR spreads approximately half the dynamic range DR, so the LRADC 116 can be implemented utilizing architecture of fewer bits.

Figure 4:
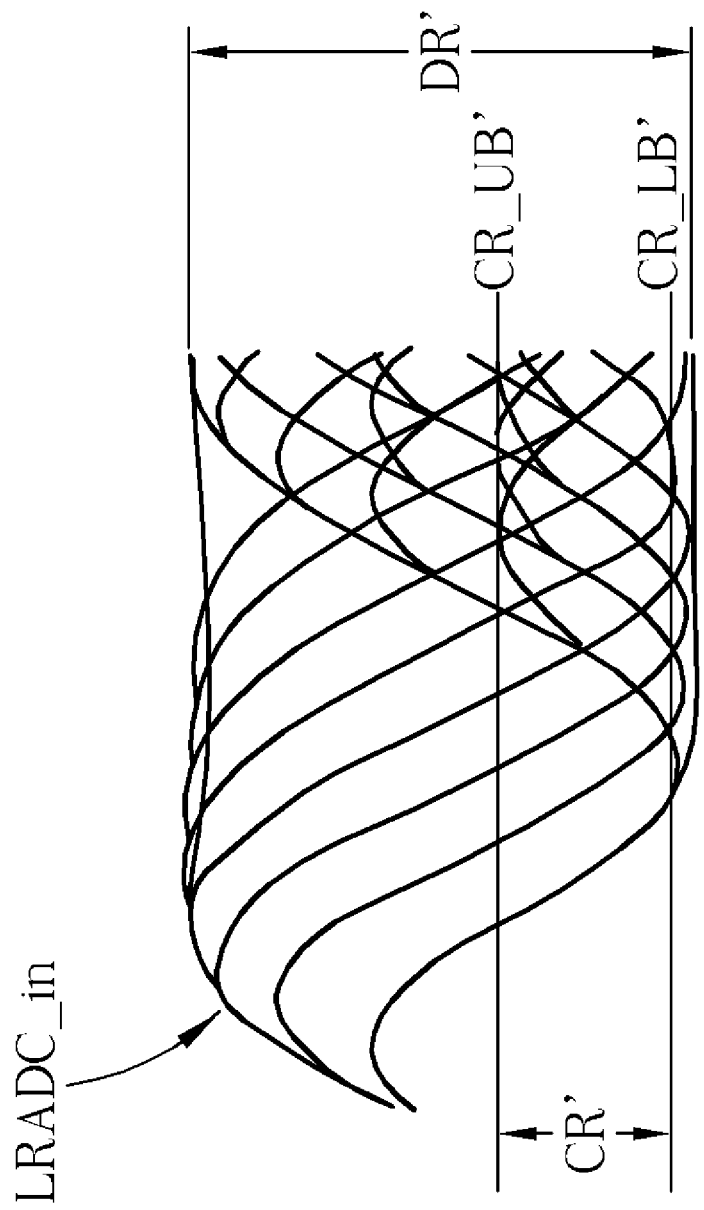
FIG. 4 is a diagram of another conversion range of the low-resolution ADC shown in FIG. 1.

Please refer to FIG. 4 illustrating another eye diagram of the input signal LRADC_in of the LRADC 116 shown in FIG. 1. Those skilled in the art should understand that the eye diagram shown in FIG. 4 is derived in a situation where the disc read back signal DRB demonstrates a non-linear characteristic. The conversion range CR' shown in FIG. 4 even reaches as narrow as one third of a dynamic range DR' of the output signal S11, so the LRADC 116 can be implemented utilizing architecture of even fewer bits. As a result, further downsizing of the ADC design is possible and therefore, the die size and the power consumption are reduced correspondingly.

Figure 5:
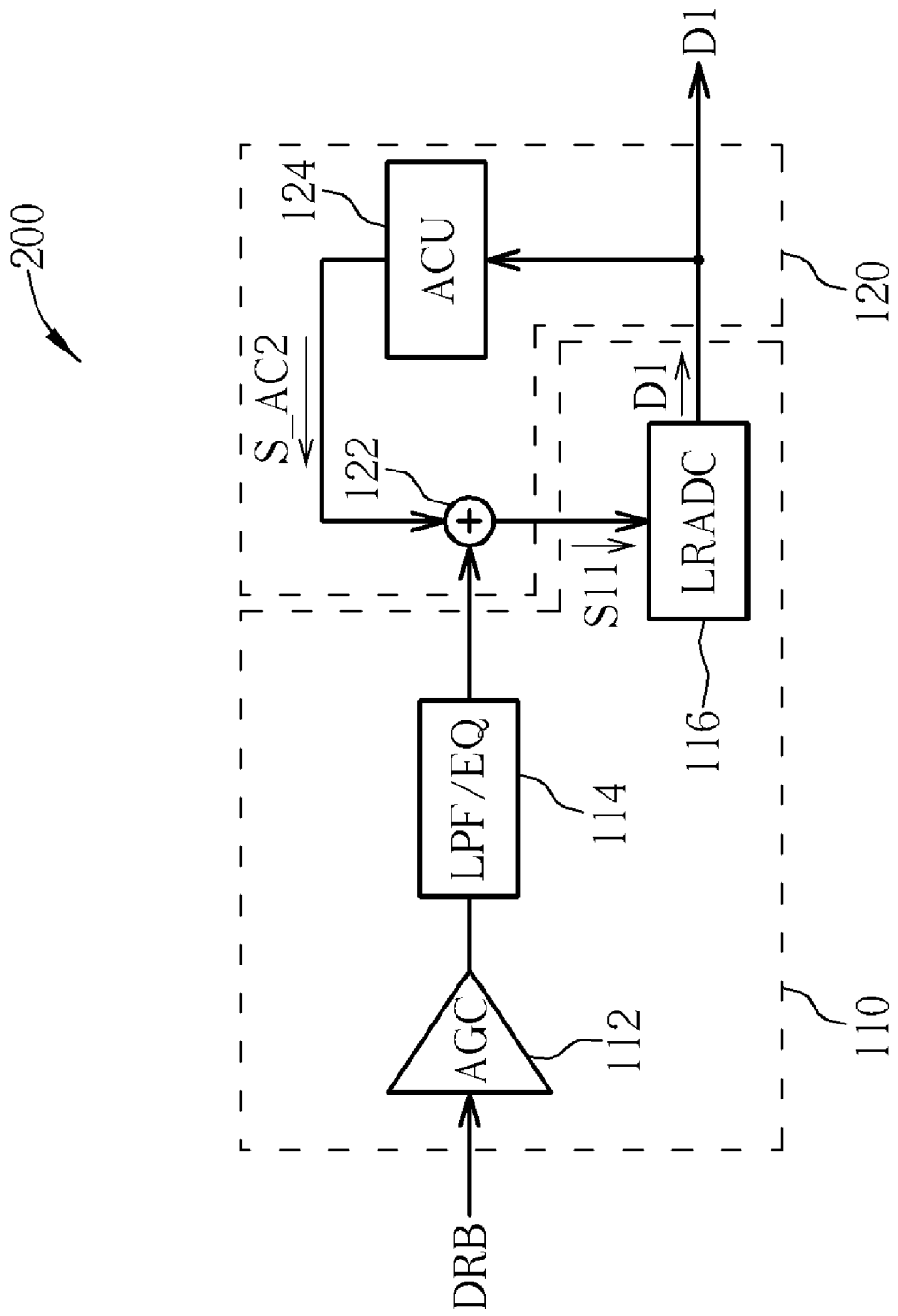
FIG. 5 is a diagram of an input sampling circuit according to a second embodiment of the present invention.

Please refer to FIG. 5 illustrating a diagram of an input sampling circuit 200 according to a second embodiment of the present invention. In addition to the conversion circuit 110 of the first embodiment shown in FIG. 1, the input sampling circuit 200 of the second embodiment further includes a direct current (DC) adjustment module 120. The DC adjustment module 120 includes an asymmetry compensation unit (ACU) 124 for generating a compensation signal S_AC2 according to the digital signal D1 outputted by the LRADC 116. This is to adjust a DC level of the output signal S11 of the LPF/EQ 114 with an adder 122 according to the compensation signal S_AC2. In an example described in the following, the digital signal D1 derived from sampling by the LRADC 116 has digital values, which are RLL encoded values well known to those skilled in optical disc drive system applications, such as, for an example of a 3-bit LRADC, 011, 010, 001, 000, 100, 111, 110, and 101 respectively corresponding to levels of the output signal S11 in decreasing order. In this embodiment, the ACU 124 generates the compensation signal S_AC2 to adjust the DC level of the output signal S11 according to a set of show-up rates M(8:1) maintained by the ACU 124, which respectively indicate the number of times of showing up of the digital values 011, 010, 001, 000, 100, 111, 110, and 101 during a given period when sampling, with M(8), M(7), . . . , and M(1) respectively corresponding to 011, 010, 001, 000, 100, 111, 110, and 101.

Operations of the DC adjustment module 120 when adjusting the DC offset of the output signal S11 according to this embodiment are described as follows. As mentioned above, the LRADC 116 sets the digital signal D1 to be the digital value 011 representative of the upper bond CR_UB of the conversion range CR when a level of the output signal S11 is greater than the upper bond CR_UB, and the LRADC 116 sets the digital signal D1 to be the digital value 101 representative of the lower bond CR_LB of the conversion range CR when a level of the output signal S11 is less than the lower bond CR_LB. Therefore, if the show-up rate M(8) of the digital value 011 corresponding to the highest level turns out to be greater than the show-up rate M(1) of the digital value 101 corresponding to the lowest level, the DC adjustment module 120 generates the compensation signal S_AC2 to decrease the DC level of the output signal S11 since the DC level of the output signal S11 is considered to be too high. For example, if a difference (M(8)–M(1)) is greater than a specific threshold, the DC adjustment module 120 decreases the DC level of the output signal S11. On the other hand, if the show-up rate M(8) of the digital value 011 corresponding to the highest level is less than the show-up rate M(1) of the digital value 101 corresponding to the lowest level, the DC adjustment module 120 generates the compensation signal S_AC2 to increase the DC level of the output signal S11 since the DC level of the output signal S11 is considered to be too low. For example, if a difference (M(1)–M(8)) is greater than a specific threshold, the DC adjustment module 120 increases the DC level of the output signal S11.

Figure 6:
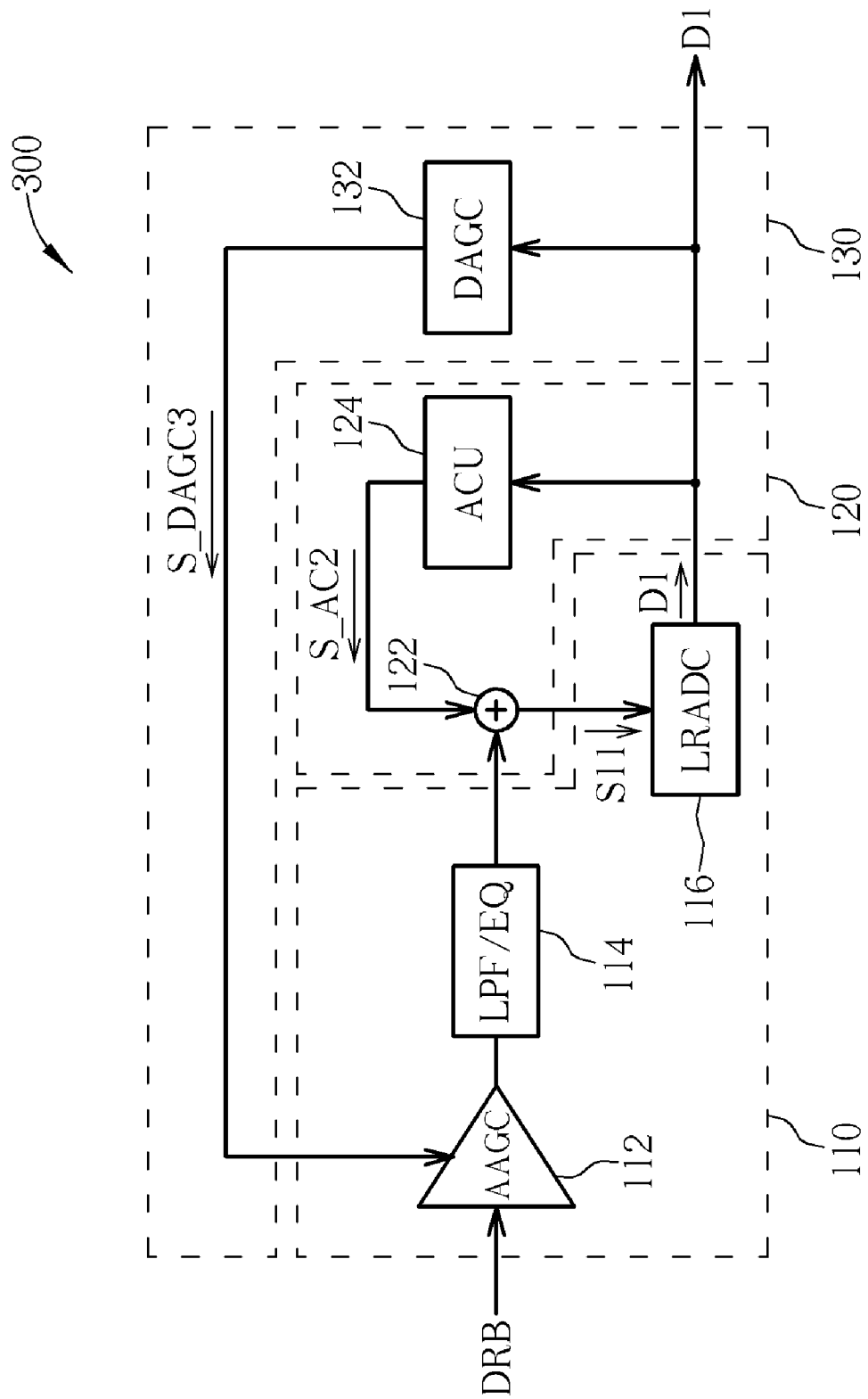
FIG. 6 is a diagram of an input sampling circuit according to a third embodiment of the present invention.

Please refer to FIG. 6 illustrating a diagram of an input sampling circuit 300 according to a third embodiment of the present invention. In addition to the conversion circuit 110 and the DC adjustment module 120 of the second embodiment shown in FIG. 5, the input sampling circuit 300 of the third embodiment further includes a gain adjustment module 130. In this embodiment, the gain adjustment module 130 includes a digital AGC (DAGC) unit 132 for generating a gain control signal S_DAGC3 according to the digital signal D1. As a result, the DAGC unit 132 controls the AGC unit 112 utilizing the gain control signal S_DAGC3 to adjust the gain value of the disc read back signal DRB. In order to implement the operations mentioned above, the AGC unit 112 of this embodiment is an analog AGC (AAGC) unit, which is well known in the art and therefore is not described herein. In this embodiment, the DAGC unit 132 generates the gain control signal S_DAGC3 according to the show-up rates M(8:1) of the digital values 011, 010, 001, 000, 100, 111, 110, and 101, respectively, to adjust the gain value of the disc read back signal DRB.

Operations of the gain adjustment module 130 when adjusting the gain value of the disc read back signal DRB according to this embodiment are described as follows. Similarly, due to the characteristic of the saturating operation performed by the LRADC 116, if the show-up rate M(8) of the digital value 011 corresponding to the highest level and/or the show-up rate M(1) of the digital value 101 corresponding to the lowest level are greater than the rest of the show-up rates M(7:2) of the other digital values 010, 001, 000, 100, 111, and 110 which respectively correspond to the other levels, the DAGC unit 132 controls the AAGC unit 112 to decrease the gain value of the disc read back signal DRB since the dynamic range DR of the output signal S11 is considered to be too large and should be decreased. For example, if a difference between one of the show-up rates M(8) and M(1) and one of the other show-up rates M(7:2) is greater than a specific threshold, the DAGC unit 132 controls the AAGC unit 112 to decrease the gain value of the disc read back signal DRB. Conversely, if the show-up rate M(8) of the digital value 011 corresponding to the highest level and/or the show-up rate M(1) of the digital value 101 corresponding to the lowest level are less than the rest of the show-up rates M(7:2) of the other digital values 010, 001, 000, 100, 111, and 110 which respectively correspond to the other levels, the DAGC unit 132 controls the AAGC unit 112 to increase the gain value of the disc read back signal DRB since the dynamic range DR of the output signal S11 is considered to be too small and should be increased. For example, if a difference between one of the show-up rates M(8) and M(1) and one of the other show-up rates M(7:2) is less than a specific threshold, the DAGC unit 132 controls the AAGC unit 112 to increase the gain value of the disc read back signal DRB.

Figure 7:
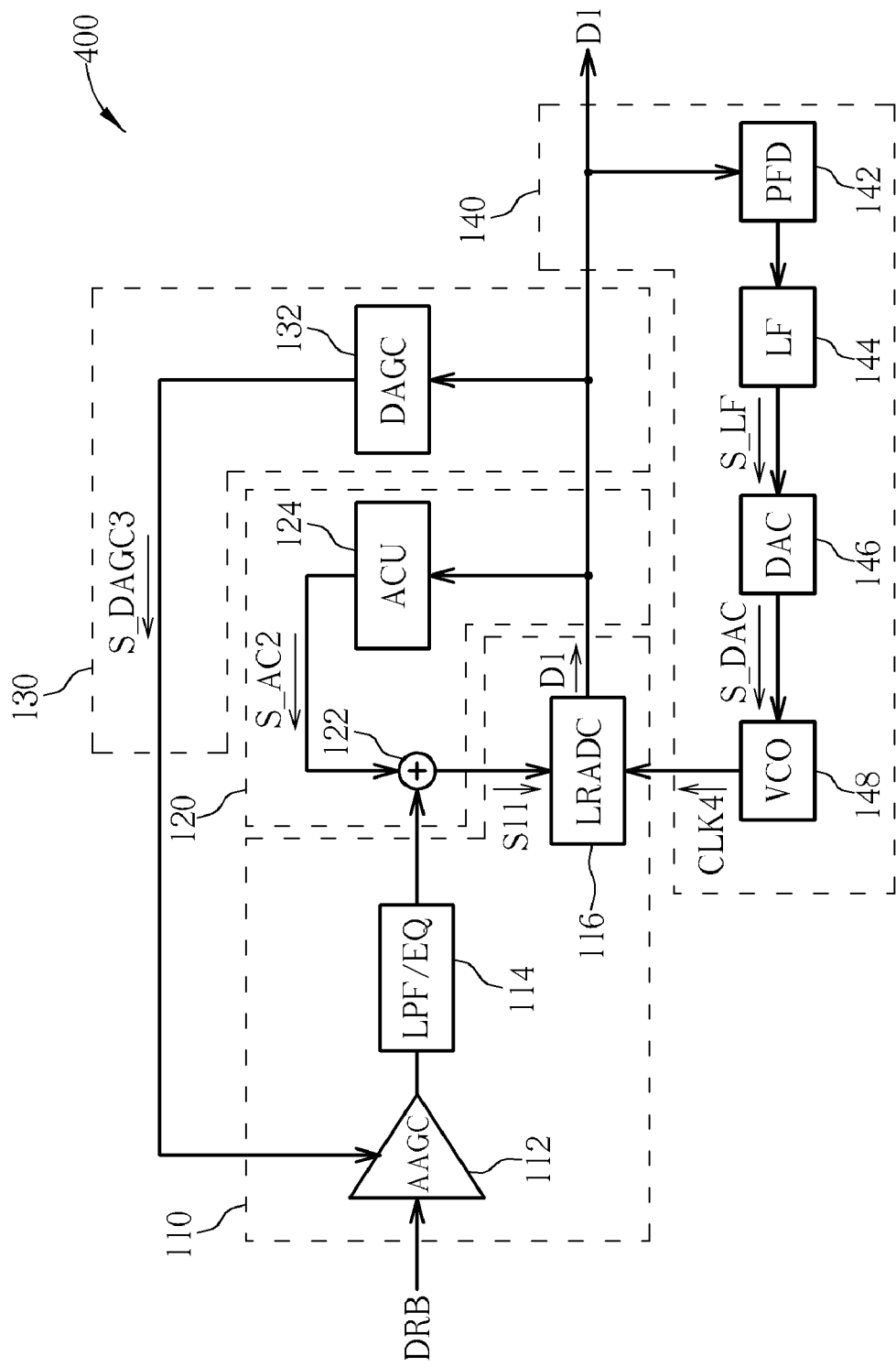
FIG. 7 is a diagram of an input sampling circuit according to a fourth embodiment of the present invention.

Please refer to FIG. 7 illustrating a diagram of an input sampling circuit 400 according to a fourth embodiment of the present invention. In addition to the conversion circuit 110, the DC adjustment module 120, and the gain adjustment module 130 of the third embodiment shown in FIG. 6, the input sampling circuit 400 of the fourth embodiment further includes a phase-locked loop (PLL) 140. In this embodiment, the PLL 140 includes a phase/frequency detector (PFD) 142, a loop filter (LF) 144, a digital-to-analog converter (DAC) 146, and a voltage-controlled oscillator (VCO) 148, whereof the circuit architecture and operation principles are well known in the art. The PLL 140 provides the LRADC 116 with a sampling clock CLK4, so the LRADC 116 may perform sampling operation according to the sampling clock CLK4.

Please note that if the sampling frequency of the LRADC 116 is high enough, a re-sampler coupled to the LRADC 116 and subject to digital control can be utilized for replacing the VCO 148 subject to analog control. The architecture and operation principles of the re-sampler are well known in the art and therefore have no need to be described herein.

Figure 8:
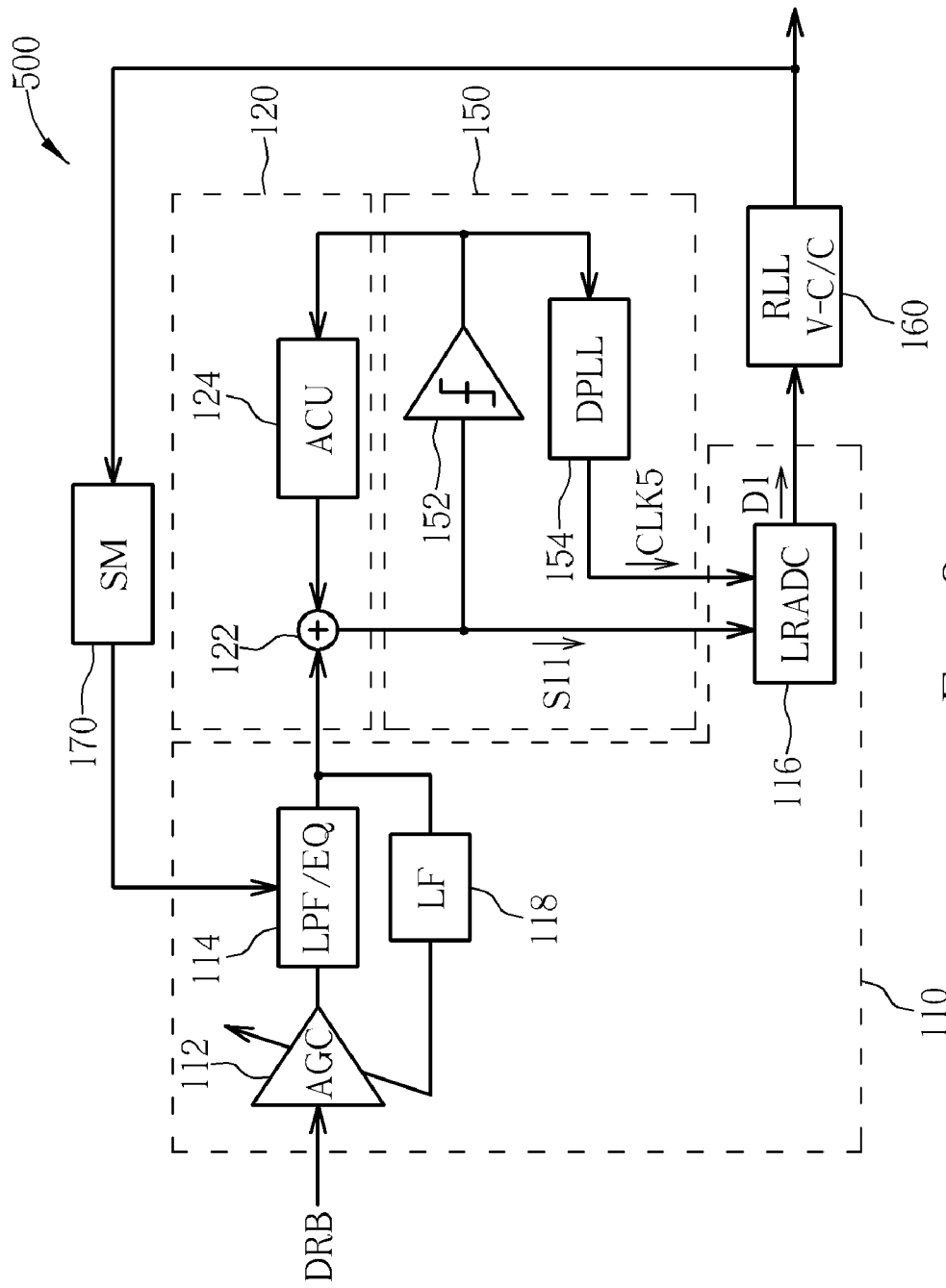
FIG. 8 is a diagram of an input sampling circuit according to a fifth embodiment of the present invention.

Please refer to FIG. 8 illustrating a diagram of an input sampling circuit 500 according to a fifth embodiment of the present invention. In addition to the conversion circuit 110 and the DC adjustment module 120 of the second embodiment shown in FIG. 5, the input sampling circuit 500 of the fifth embodiment further includes a clock-generating module 150, an RLL violation checking/correction (RLL V-C/C) unit 160, and a state machine (SM) 170. The clock-generating module 150 utilizes a slicer 152 and a digital PLL (DPLL) 154 to generate a sampling clock CLK5 according to the output signal S11, and provides the LRADC 116 with the sampling clock CLK5, so the LRADC 116 may perform sampling operation according to the sampling clock CLK5. In this embodiment, the ACU 124 adjusts the DC level of the output signal S11 according to a square wave signal generated by the slicer 152. The circuit architecture of the clock-generating module 150 mentioned above and operations thereof are well known in the art and are not described herein. In addition, the digital signal D1 generated through the processing of the input sampling circuit 500 of this embodiment can be sent to the RLL V-C/C unit 160, so that the RLL V-C/C unit 160 may perform RLL V-C/C on the digital signal D1. According to a result outputted by the RLL V-C/C unit 160, the SM 170 optimizes parameters of the LPF/EQ 114. For example, the SM 170 may adjust locations of zeros or poles in a transfer function of the LPF/EQ 114. The circuit architecture of the RLL V-C/C unit 160 and the SM 170 mentioned above and operation principles thereof are well known in the art and are not detailed herein. Furthermore, the input sampling circuit 500 may utilize a loop filter (LF) 118 to adjust the gain value of the AGC unit 112. The circuit architecture of the LF 118 and operation principles thereof are also well known in the art and are not detailed herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An input sampling circuit for processing a disc read back signal to generate a digital signal, comprising:
    an auto gain control (AGC) unit for adjusting a gain value of the disc read back signal;
    a low-pass filter/equalizer (LPF/EQ) coupled to the AGC unit for low-pass filtering/equalizing the disc read back signal to generate an output signal; and
    an analog-to-digital converter (ADC) coupled to the LPF/EQ for performing analog-to-digital conversion on the output signal across a conversion range that is narrower than a dynamic range of the output signal to convert the output signal into the digital signal.

2. The input sampling circuit of claim 1, wherein the conversion range locates in the dynamic range.

3. The input sampling circuit of claim 1, wherein the ADC sets the digital signal to be a digital value corresponding to an upper bond of the conversion range when a level of the output signal is greater than the upper bond, and the ADC sets the digital signal to be a digital value corresponding to a lower bond of the conversion range when a level of the output signal is less than the lower bond.

4. The input sampling circuit of claim 1, further comprising:
    a direct current (DC) adjustment module for adjusting a DC level of the output signal according to the digital signal.

5. The input sampling circuit of claim 4, wherein the DC adjustment module adjusts the DC level of the output signal according to appearing rates of digital values of the digital signal.

6. The input sampling circuit of claim 4, wherein the DC adjustment module comprises:
    an adder coupled to the LPF/EQ and the ADC for adjusting the DC level of the output signal according to a compensation signal; and
    an asymmetry compensation unit coupled to the adder for generating the compensation signal according to the digital signal.

7. The input sampling circuit of claim 6, further comprising:
    a slicer coupled to the adder and the asymmetry compensation unit for converting the output signal into a square wave signal according to a slice level;
    wherein the asymmetry compensation unit generates the compensation signal according to the square wave signal.

8. The input sampling circuit of claim 1, further comprising:
    a slicer for generating a square wave signal according to the output signal; and
    a digital phase-locked loop (PLL) for providing the ADC with a sampling clock according to the square wave signal.

9. The input sampling circuit of claim 1, further comprising:
    a digital AGC unit coupled to the ADC and the AGC unit of claim 1 for controlling the AGC unit according to the digital signal to adjust the gain value of the disc read back signal.

10. The input sampling circuit of claim 9, wherein the digital AGC unit adjusts the gain value of the disc read back signal according to appearing rates of digital values of the digital signal.

11. The input sampling circuit of claim 1, further comprising:
   a phase-locked loop (PLL) coupled to the ADC for providing the ADC with a sampling clock according to the digital signal.

12. The input sampling circuit of claim 1, further comprising:
   an RLL violation checking/correction unit for performing RLL violation checking/correction on the digital signal.

13. An input sampling method for processing a disc read back signal to generate a digital signal, comprising:
   adjusting a gain value of the disc read back signal;
   low-pass filtering/equalizing the disc read back signal to generate an output signal; and
   performing analog-to-digital conversion on the output signal across a conversion range that is narrower than a dynamic range of the output signal to convert the output signal into the digital signal.

14. The input sampling method of claim 13, wherein the conversion range locates in the dynamic range.

15. The input sampling method of claim 13, wherein the step of performing the analog-to-digital conversion further comprises:
   setting the digital signal to be a digital value corresponding to an upper bond of the conversion range when a level of the output signal is greater than the upper bond; and
   setting the digital signal to be a digital value corresponding to a lower bond of the conversion range when a level of the output signal is less than the lower bond.

16. The input sampling method of claim 13, further comprising:
   adjusting a DC level of the output signal according to appearing rates of digital values of the digital signal.

17. The input sampling method of claim 13, further comprising:
   converting the output signal into a square wave signal according to a slice level; and
   adjusting a DC level of the output signal according to the square wave signal.

18. The input sampling method of claim 13, further comprising: adjusting the gain value of the disc read back signal according to appearing rates of digital values of the digital signal.

* * * * *